United States Patent
McNamara et al.

(10) Patent No.: US 9,207,682 B2
(45) Date of Patent: *Dec. 8, 2015

(54) ELECTRONICALLY CONTROLLED HOT WATER RECIRCULATION PUMP WITH DATA LOGGING

(71) Applicant: Taco, Inc., Cranston, RI (US)

(72) Inventors: Michael E. McNamara, Coventry, RI (US); Robert Kellicker, Upton, MA (US); Christian Gonzales, Providence, RI (US)

(73) Assignee: Taco, Inc., Cranston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/080,489

(22) Filed: Nov. 14, 2013

(65) Prior Publication Data

US 2014/0074302 A1 Mar. 13, 2014

Related U.S. Application Data

(63) Continuation of application No. 13/932,745, filed on Jul. 1, 2013, now abandoned, which is a continuation of application No. 13/029,851, filed on Feb. 17, 2011, now Pat. No. 8,594,853.

(60) Provisional application No. 61/305,805, filed on Feb. 18, 2010.

(51) Int. Cl.
G05D 11/00 (2006.01)
G05D 7/06 (2006.01)
F24D 19/10 (2006.01)
F24D 17/00 (2006.01)

(52) U.S. Cl.
CPC .......... *G05D 7/0617* (2013.01); *F24D 17/0078* (2013.01); *F24D 19/1051* (2013.01); *F24D 19/1063* (2013.01)

(58) Field of Classification Search
USPC ................................ 700/282; 715/772; 137/2
See application file for complete search history.

(56) References Cited

U.S. PATENT DOCUMENTS

| | | | |
|---|---|---|---|
| 5,924,391 A | 7/1999 | Baker et al. | |
| 6,212,894 B1 | 4/2001 | Brown et al. | |
| 6,588,377 B1* | 7/2003 | Leary et al. ................. | 122/19.1 |
| 8,028,355 B2 | 10/2011 | Reeder et al. | |
| 8,201,553 B2 | 6/2012 | Pussell | |
| 8,498,523 B2 | 7/2013 | Deivasigamani et al. | |
| 2003/0089399 A1 | 5/2003 | Acker | |
| 2008/0271238 A1* | 11/2008 | Reeder et al. ................... | 4/597 |
| 2009/0099701 A1* | 4/2009 | Li et al. ....................... | 700/284 |
| 2009/0165875 A1* | 7/2009 | Winn ...................... | 137/624.27 |
| 2009/0211644 A1* | 8/2009 | Wylie et al. ....................... | 137/2 |

(Continued)

FOREIGN PATENT DOCUMENTS

WO WO2004070279 A2 8/2004

*Primary Examiner* — Robert Fennema
*Assistant Examiner* — Anthony Whittington
(74) *Attorney, Agent, or Firm* — Barry G. Magidoff; Paul J. Sutton

(57) ABSTRACT

A water pump controlled by a microcontroller and operated to pump hot water for specific recirculation periods during a multi-day cycle. The recirculation periods are determined from hot water usage data logged by the microcontroller during a logging period occurring in the previous multi-day cycle. A preferred cycle is during a seven-day, or one-week, period.

10 Claims, 3 Drawing Sheets

(56) References Cited

U.S. PATENT DOCUMENTS

| | | | |
|---|---|---|---|
| 2010/0025008 A1* | 2/2010 | Walford | 165/45 |
| 2010/0096018 A1* | 4/2010 | Wylie et al. | 137/2 |
| 2010/0195991 A1* | 8/2010 | Deivasigamani et al. | 392/308 |
| 2010/0224182 A1* | 9/2010 | Pussell | 126/585 |
| 2010/0313765 A1* | 12/2010 | Hale | 99/288 |
| 2011/0163534 A1* | 7/2011 | Biel | 285/123.1 |

\* cited by examiner

ELECTRONICALLY CONTROLLED HOT WATER RECIRCULATION PUMP WITH DATA LOGGING

This application is a continuation of pending continuation application Ser. No. 13/932,745 filed Jul. 1, 2013 and allowed U.S. patent application Ser. No. 13/029,851 filed on Feb. 17, 2011 to be issued as U.S. Pat. No. 8,594,853 on Nov. 26, 2013, which application claims the benefit or priority pursuant to 35 U.S.C. 119(e) from U.S. Provisional Patent Application having Application No. 61/305,805 filed Feb. 18, 2010.

BACKGROUND OF THE INVENTION

1. Field of the Invention

The present invention relates to a processor controlled water pump.

2. Description of the Related Art

In some parts of the country, hot water is often continuously circulated within the closed water system of a house or business. This is done to reduce the wasting of flowing water while waiting for the hot water to reach a tap in a bathroom or kitchen of a house or office center; the idea is if the water is kept hot at all times, a user will get hot water instantaneously when the user has a demand for hot water. Presumably, the circulating of hot water continuously makes it available at various tap points in a system as needed, thus eliminating the need to run the water at the tap point until it reaches a desired temperature before it can be used.

One example, is a user wanting to take a shower on a cold morning; without the continuously circulating hot water, the user will turn on the shower, and as the piping system will generally have cooled down to no higher than room temperature by the morning, all of the water in the pipes must be exhausted through the tap, before the hot water stored in the hot water tank reaches the shower head. The user must wait until the water reaches a "comfortable" temperature while the shower is running. This wastes valuable water because the user waits for the water to reach a comfortable temperature while the tap is running before he/she can start to use the water. The continuous pumping of the hot water to circulate it throughout a water system thus eliminates the inherent waste of water in non-circulating systems. However, relatively large amounts of energy are needed to circulate the water continuously and thus this approach is wasteful, because heat loss occurs in the piping and most practical real world systems have large periods of time where no one is using the hot water and yet it is still being circulated and maintained at a relatively high temperature.

In some areas, instead of continuously circulating the water in the system, a pump can be made to operate in a continuous pulse mode, i.e., on for a period and off for a period, on a continuing basis. For example, a pulse mode can comprise 75 seconds on and 15 minutes off, all day, every day.

BRIEF SUMMARY OF THE INVENTION

The present invention provides a smart pump which is controlled by a microcontroller, and method for instructing the microcontroller by continuously receiving data from the hot water system circulated by the smart pump. The circulation of hot water is done at various times called recirculation periods which are time periods during which hot water usage is expected based on logged hot water usage data, from a prior base period. That is, the microcontroller togs occurrences of hot water usage during a data logging period and then operates a water pump in accordance with this hot water usage data pattern, during the immediately subsequent period. The smart pump comprises a water pump mechanism coupled to and controlled by a microcontroller which logs hot water usages based on signals received from one or more sensors that detect occurrences of hot water usage by detecting a temperature increase in the hot water system. With the use of a sensor, a minimum threshold can be set for a temperature increase. When the temperature increase equals or surpasses the threshold, such an increase is detected by the sensor which sends a signal to the microcontroller indicating the increase. Upon receipt of the signal from the sensor, the microcontroller logs and records the hot water usage, at that particular time. The sensors as well as the microcontroller and related circuitry may be located within the water pump mechanism. The sensors may also be located external to the water pump mechanism. Depending on the state of a user operated automatic switch coupled to the microcontroller, the smart pump can operate in a continual pulse mode or an automatic mode, or be turned off completely.

In the pulse mode, the smart pump functions by pumping hot water continuously for a defined period of time every cycle. The cycles are contiguous time periods. In the automatic mode, the microcontroller controls the water pump mechanism to operate in accordance with the previous data logging period's hot water usage. The data logging period comprises one or more recirculation periods during a day, each of which is a period encompassed by a start usage cycle and an end usage cycle.

The recirculation period may comprise one or more start/end usage cycles and the data logging period comprises one or more recirculation periods. While logging data, the microcontroller can continue to operate the pump in accordance with a current usage pattern. The current data usage pattern may define the start and end of the recirculation periods being logged. Once the data logging period expires, the microcontroller, when in automatic mode, operates the water pump mechanism in accordance with the logged usage data pattern. The microcontroller may start another data togging period and proceed to start logging usages of hot water once again over a data logging period of the same length or of a different length to generate another hot water usage data pattern and again update the operation of the water pump mechanism when this next data logging period expires. It should be noted that during a recirculation period, a pump may operate continuously or in a pulse mode; the pulse mode, for example, providing for the pump being on for 75 seconds, off for 15 minutes.

BRIEF DESCRIPTION OF TUE DRAWINGS

DETAILED DESCRIPTION

Figure 1A:
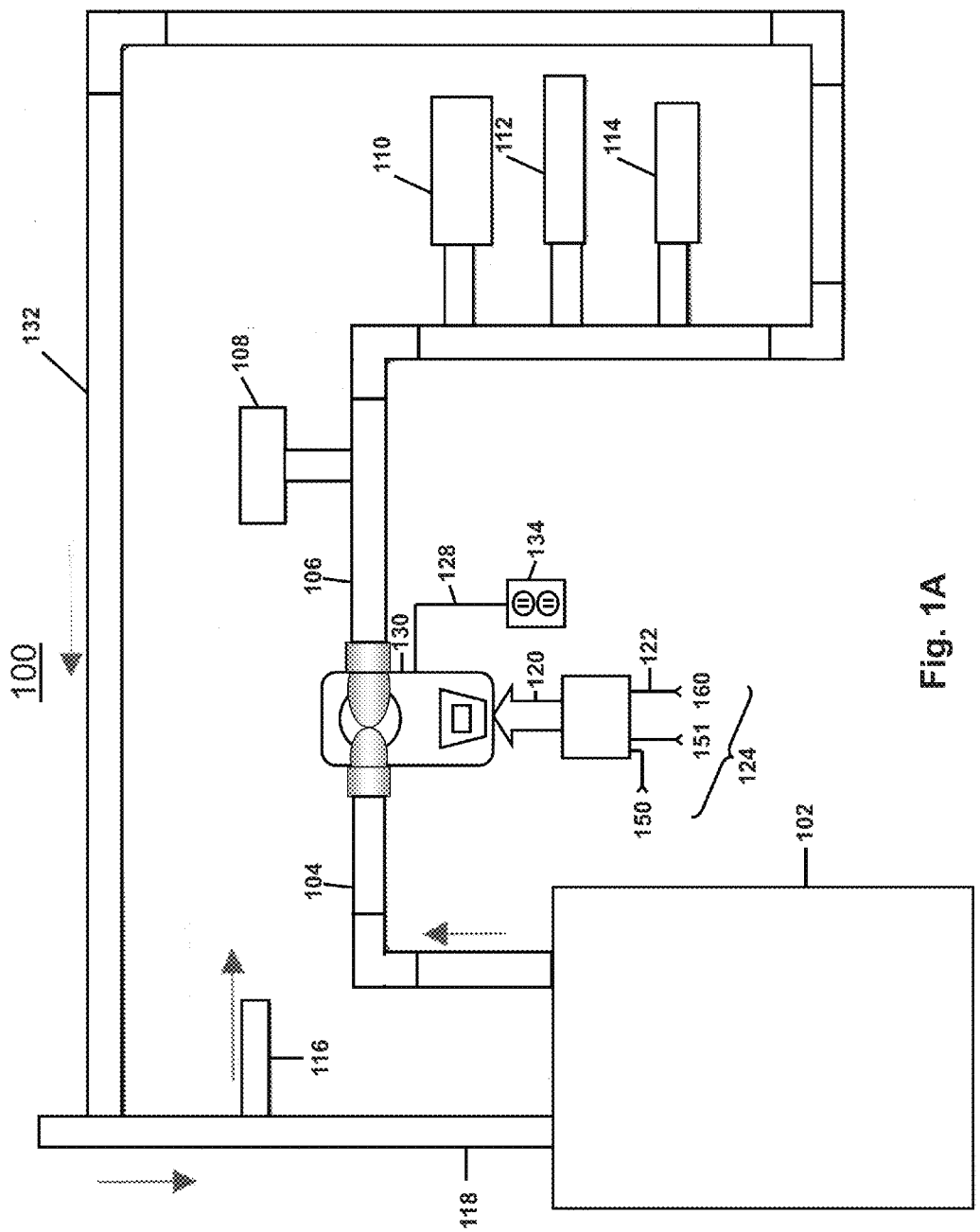
FIG. 1A is a diagram of a preferred smart pump installed in a hot water system of a newly constructed household.

Referring to FIG. 1A, there is shown the smart pump of the present invention which comprises an electrically controlled water pump mechanism 130 coupled via a digital bus or signal interface 120 to a microcontroller 122 having an N-input port 124 for receiving signals from one or more sensors 150, 151, ... 160 located within the pumping mechanism 130 or remotely from the water pumping mechanism 130 and one of said input ports, 150, is used to receive the state of a user controlled AUTO switch (not shown) for setting the smart pump of the present invention in automatic mode as described below. N is an integer equal to 1 or greater. For ease of explanation and to provide some context to the operation of the smart pump of the present invention, it is shown as part of a closed water system of a household. The system has a hot water tank 102 which receives cold water via pipe segment 118 and generates hot water provided to water pumping mechanism 130 via pipe segment 104. Water pump mechanism 130 pumps the hot water via pipe segment 106 to various hot water taps 108, 110, 112, and 114. The hot water return path is provided by pipe segment 132.

When set to the automatic mode with the AUTO switch (not shown), water pump mechanism 130 pumps the hot water in accordance with the method of the present invention as described herein. The various hot water taps are typical locations (e.g., kitchen, bathroom sink, tub/shower, laundry) in a household where hot water is used for various purposes. The smart pump is powered with power cord 128 connected to AC outlet 134 for providing power. In other embodiments, the smart pump may be powered by batteries disposed within a cavity of the water pumping mechanism. Also, microcontroller 122 along with signal interface 120, input port 124 and associated circuitry may be disposed within the same or other cavity of water pumping mechanism 130. For ease of explanation, however, microcontroller 122, signal interface 120 and input port 124 are shown as being external to the water pumping mechanism 130. Microcontroller 122 may be any relatively inexpensive microprocessor or microcomputer integrated circuits that can be programmed with commands using many commercially available software packages. The programming language can be any well known High Level programming language.

The smart pump of the present invention can further comprise at least one sensor that detects the opening of a hot water tap, by changes in the flow of water in the hot water line, or by changes in the temperature of the water or pipe during a period when the pump is not in operation. To prevent accidental operation of the smart water pump, the microcontroller optionally can be programmed to require that the flow of water continue for a defined minimum period of time, before it is logged. The length of such period depends on the particular sensor being used and/or on the requirements of the closed water system.

Figure 1B:
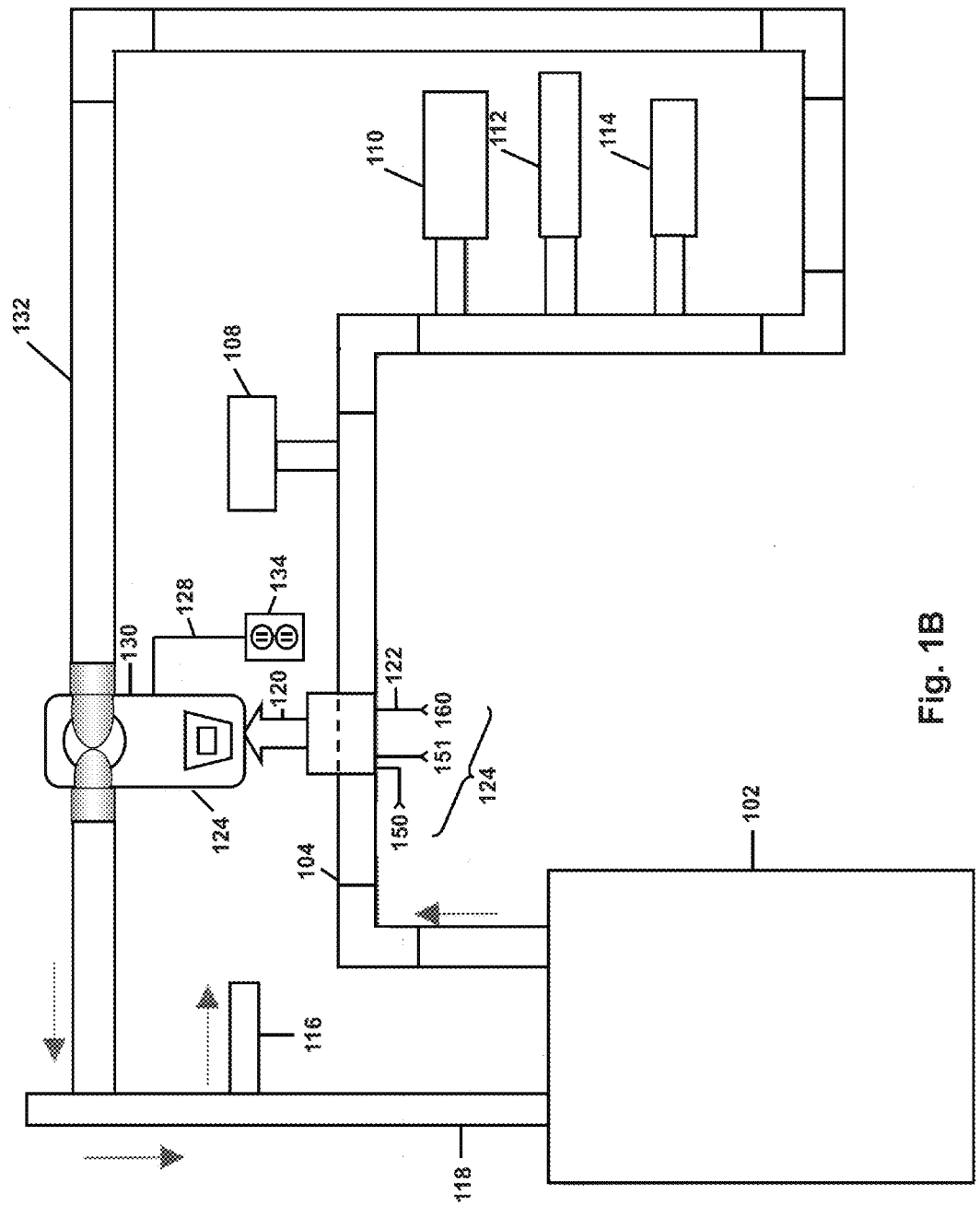
FIG. 1B is a diagram showing a possible location of a preferred smart pump installed a retrofitted hot water system of a household.

The sensor can be located within a cavity of the water pump mechanism 130, especially at the inlet to or outlet from the pump. Optionally, a sensor can be remotely located from the water pump mechanism 130, e.g., in FIG. 1B, hereto, the sensor is located at the desired location 106, and the pump located elsewhere, e.g., in pipe 132 at location 126, in-line with pipe 132, downstream from the taps, as shown in FIG. 1B, in similar fashion as it is installed in line with pipes 104 and 106, as shown in FIG. 1A. This often is the case when the system of this invention is installed after construction of the building, because it may not be convenient or efficient to install the pump upstream from the taps. A sensor at location 106, in the system of FIG. 1B, is remotely located from the pump 130, but is within the supply flow pipe segment 104/106, for detecting the flow of hot water resulting from hot water usage at any of the taps 108-114. When the pump is part of the original system included with the original construction of the building, the sensor is preferably located within the pump, at location 106, upstream of the taps. Either a remote sensor or a sensor disposed within the water pump mechanism (but not both) can be used.

As a further alternative, a sensor can be disposed at one or more of the taps (110, 112, 114), to give a direct indication of flow through that tap.

It will be readily understood by one skilled in the art to which this invention belongs that water pump mechanism 130 can be any type of electrically controllable or electronically controllable mechanism designed to operate when triggered by one or more electronic or electrical signals. As shown here, the control signals for operating the water pump mechanism 130 are transmitted from the microcontroller 122 over electrical control motor interface 120. If desired, a wireless connection can also be provided.

The water pump mechanism 130 may require electric signals of a certain voltage and current for proper operation. The control signals are transferred via the control motor interface 120 to operate, e.g., an on/off switch for the water pump mechanism 130; such control signals can be transformed or converted to electrical signals of the proper voltage and/or current sufficient to operate the pumping mechanism 130. The particular location of the sensor(s) may sometimes reflect the time of installation of the smart pump of the present invention. Generally, smart pumps installed during construction of a structure (private house or commercial structure) are located intermediate the hot water source (in FIG. 1A, a hot water tank 102 and the hot water taps, e.g., tap 108) and have sensor(s) located within or immediately adjacent the water pump mechanism 130; and a smart pump installed after construction can be located at another more accessible part of the hot water system, for example in the "Hot Water Return" line, as shown in FIG. 1B; and in that case the sensor is located remotely from the water pump mechanism 130, such as, preferably, at location 126 within the supply flow pipe line 104, downstream from the hot water tank.

When a sensor detects hot water flow or a sufficient temperature change (e.g., a temperature rise) it sends a signal via a wire (or wirelessly) to the microcontroller 122. Additional circuitry (not shown, but conventionally available) is typically needed to convert the sensor signal to a proper format for reception by the microcontroller 122. Upon reception of the sensor signal, it is togged by the microcontroller 122, which controls the water pumping mechanism 130 and causes it to perform the steps of the method of the present invention.

Figure 2:
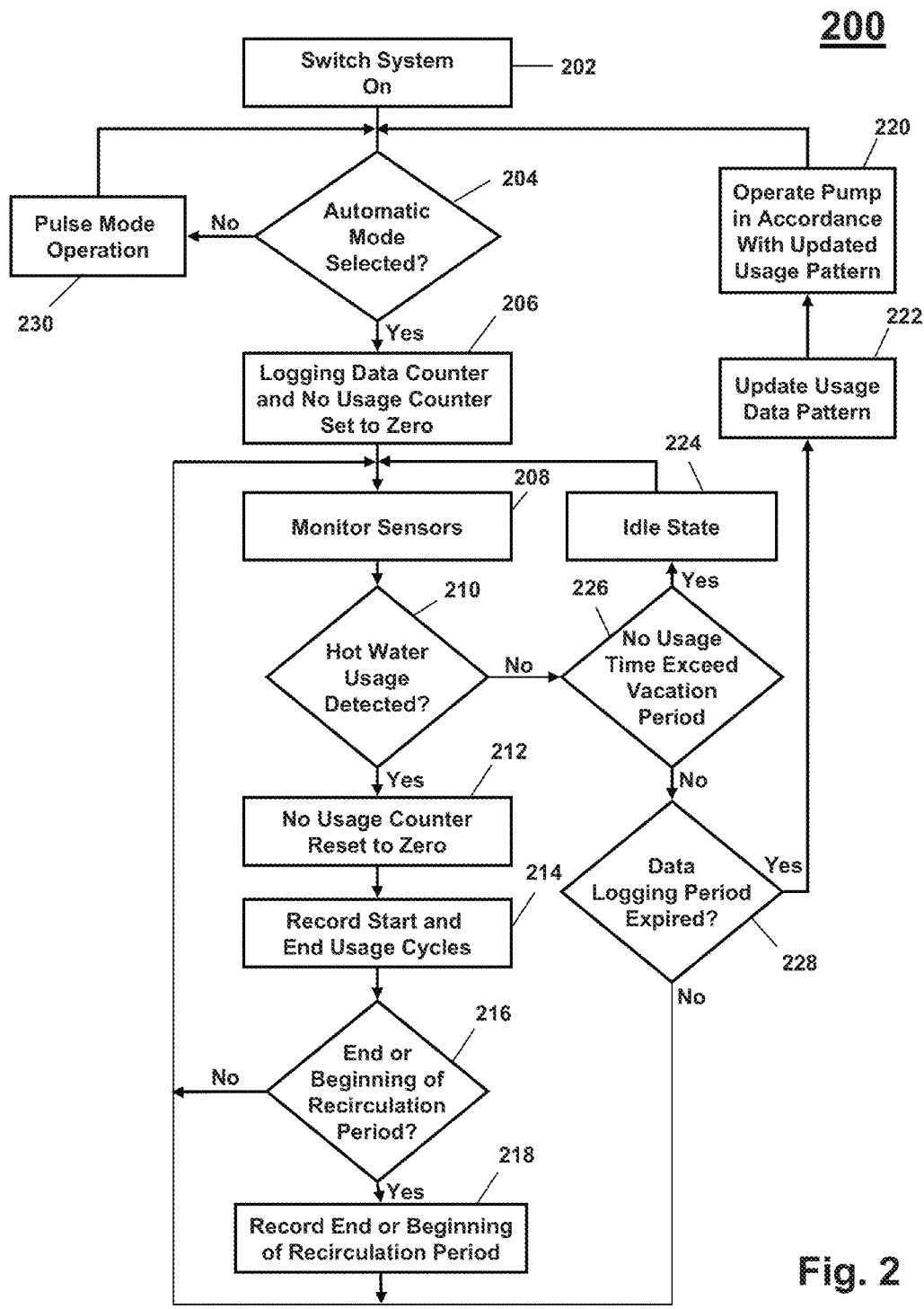
FIG. 2 is a flow chart representing the operation of the smart pump in automatic mode and pulse mode.

Referring now to FIG. 2 there is shown a flow chart of the method of the present invention. Initially, power is provided to the smart pump and microcontroller of the present invention in step 202. In step 204, microcontroller 122 reads the status of its input port corresponding to the AUTO switch to determine whether a user of the smart pump has switched the smart pump to automatic operation. If automatic operation is not selected, the method of the present invention moves to step 230 and enters the, e.g., PULSE mode wherein the smart pump continuously pumps water (regardless of the sensor output) for a period of, e.g., 75 seconds every 15 minutes, or it can be in the Off mode, where the pump is not operating. As FIG. 2 shows, the smart pump of the present invention will remain in an operating mode, e.g., the PULSE mode of operation, or Off until the AUTO switch is set to the automatic mode.

The method of the present invention moves to step 206 when microcontroller 122 has detected that AUTOMATIC operation has been selected. In step 206, microcontroller 122 initializes a counter (i.e., a timer) that is to indicate the logging period during which various usages of hot water are detected, the length of time of each of said usages, the beginning and end of each of said usages. Documenting the time at which the initial daily hot water usage is detected, the length of each said usages and the beginning and end of each said usage, for each day, constitute logging a water usage. These various usages are logged within a certain time period and thus this period (typically 7 days) is referred to as the data togging period. Also, step 206 another timer can be provided (called the no usage counter) which can be set to measure any period of no hot water usage that exceeds a certain threshold. For example, the threshold may be set to 36 hours. If no hot water usage is detected for 36 consecutive hours, the method of the present invention will cause the smart pump to enter into an IDLE or Off, mode of operation during which the smart pump does not pump any water until it detects hot water usage or detects a signal to restart. Thus, for example, after step 206, the method of the present invention moves to step 208 wherein microcontroller 122 monitors the sensor(s). If hot water usage is not detected, the no usage timer continues to measure the time of no usage and when that time exceeds a predefined period (36 hours, in our example) the smart pump enters the IDLE mode but the microcontroller continues to monitor the sensor(s). This is reflected by steps 208 to 210 to 226 to 224 and then back to step 208. The method of the present invention will remain in this IDLE loop defined by the aforementioned steps until it detects hot water usage or is signaled to restart. Note that during the IDLE mode of operation, the tinier measuring the data logging period is also running. This will allow the pump to remain idle if there are days during the data logging period (e.g., 7-day period) when there is no hot water flow. Examples of no hot water usage include time periods when no one is occupying a residence due to vacation or occupants are away for a weekend for example.

The method of the present invention then moves to step 212 where detection of hot water usage by a sensor has occurred and the resulting sensor signal is read by microcontroller 122. In step 212 the method of the present invention resets the no usage counter to zero time. Effectively, each time hot water usage is detected, the no usage counter is reset to zero. In step 214, start and end usage cycles (e.g., the daily start times and end times of hot water usage) of the detected water usage are detected, for each day, but a pre-run period of X minutes and a post-run period of Y minutes is recorded or logged for the start usage cycles and end usage cycles respectively. For example, if on a Tuesday, hot water usage is detected at 8:10 am at a fixture, then the following Tuesday, hot water will be supplied to that fixture starting at 7:10 am and ending at 9:10 am; here X, the pre-run period is 60 minutes and Y, the post run period is also 60 minutes.

In another example, if a shower was used on a Friday starting at 6:00 am and ending at 6:15 am, then the following Friday, hot water will be pumped to that shower starting at 5:00 am until 7:15 am where once again X and Y are 60 minutes. It will be readily obvious that the length of the X and Y periods is arbitrary and different X and Y times can be programmed. Also in the circumstance where there are different sensors at different taps or fixtures throughout the house or structure, the X and Y times can be programmed for a sensor located at each such tap or Fixture. Also, the X and Y times need not necessarily be equal to each other. X and Y are variables representing time periods in minutes, hours or seconds or any combination thereof.

Throughout the data logging period, the method of the present invention determines e.g., daily start cycles and end cycles as follows. The start of a usage cycle is determined by a sudden increase in the flow of water through the hot water line, as occurs when a tap is opened. Alternatively, the start of a usage cycle is determined by a time rate of change of water temperature of K degrees per L minutes after the pump has been off for M minutes or when the pump has been off for P minutes and the water temperature remains "hot." A "hot" water temperature is defined by a particular temperature deemed to be "hot" by the sensor(s) communicating with the microcontroller 122. That is, the sensor(s) can be set at a particular threshold temperature which if surpassed by the flowing water will cause the sensor(s) to indicate detection of "hot" water. An end usage cycle is defined as a no usage period of Z hours of no usage; for example Z can equal to 2.8 hours. The variables K, L, M, P and Z represent real numbers greater than zero.

A start usage cycle can represent the start time of a recirculation period. An end usage cycle can represent the end time of a recirculation period. That is, a recirculation period is defined by the period encompassed by a stored start usage cycle time and a stored end usage cycle time. A recirculation period may, therefore, comprise one or more start/end usage cycles. In steps 216 and 218, the start and end of the recirculation periods are thus determined from data gathered by the smart pump from the prior data togging period. At the end of the first logging period, the pump will operate during a second logging period in accordance with the data logged and accumulated during the first togging period. During the second and subsequent logging periods, while the pump is operating in accordance with the usage cycles defined from the previous data logging period, the sensors and microcontroller continue to operate in accordance with the method of the present invention and continue to measure, log and record the times of hot water usage and uses the new data to determine the times of operation of the pump for the succeeding data logging period; the recirculation periods are thus continually updated. The method of the present invention continues to log data for the duration of the logging period (e.g., 7 days). Once the data togging period expires at step 228, the hot water usage data pattern that has been logged by the controller is used to update the operation of the smart pump in step 222. In step 220, the pump is operated in accordance with the updated hot water usage data pattern for at least another data logging period and the method of the present invention continues to monitor and log (or record) new data usage times while the smart pump is operated as per the last updated data pattern.

In one embodiment of the present invention, the data measured determines the earliest and latest times that hot water is used during any day of the logging period, and sets those times as the beginning and end of the pump operation during every day of the succeeding logging period. However, another embodiment can be used to log the usage times for each day of the week, and change the usage times accordingly. For example, during Monday to Friday of the week, the usage times start and end earlier each day. On the weekends, the usage times can start and end later each day.

The smart pump can be configured with a built-in power source and during a power outage, the smart pump may not be able to pump water, but when power is restored, the smart pump can return to its operating mode status immediately prior to the power outage. Another embodiment allows the smart pump to start a new data logging period upon restoration of power, the previous data having been lost when power is lost. Similarly, the microcontroller may have an initial setting preprogrammed in its system that will operate the pump during the initial start-up logging period, based upon the common usage of the general population, or it may be programmed when purchased to meet the requirements of the individual purchaser.

The device and method of the present invention have been described in terms of various embodiments as described herein. It will be readily understood that the embodiments disclosed herein do not at all limit the scope of the present invention. One of ordinary skill in the art to which this invention belongs can, after reading the disclosure, implement the device and method of the present invention using other embodiments that are different from those disclosed herein but which are well within the scope of the invention as claimed below.

What is claimed is:

1. A smart pump for a building hot water system comprising in combination:
    a water pump mechanism;
    a microcontroller comprising a data input for receiving data electronically from a sensor for sensing the flow of hot water through a hot water piping system, a time clock, a database for receiving, logging and recording data signals from a flow sensor indicating the times when a flow of hot water occurred during a pre-defined data logging time period, an operational connection to the water pump mechanism, and a software algorithm in the microcontroller for instructing the microcontroller to operate the water pump mechanism at predetermined times based upon the logged and recorded data signals;
    the water pump mechanism automatically, operationally controlled by the microcontroller in accordance with the logged and recorded hot water flow times in the data pattern generated from occurrences of hot water flows logged by the microcontroller during the immediately prior pre-defined data logging period without further input from an operator, the water pump mechanism operating to recirculate hot water through the hot water system, the logging, recording and data pattern generation occurring during each pre-defined data logging period in order to update the logged usage pattern data on an ongoing basis; and
    the micro-controller receiving logging and recording data signals during each successive pre-defined data logging time period and utilizing the recorded data signals from the flow sensor for automatically controlling the recirculation flow times for the next successive time period.

2. The smart pump of claim 1 further comprising an automatic operation switch coupled to the microcontroller for controlling the operation of the water pump mechanism.

3. The smart pump of claim 1 where a signal interface circuit couples the microcontroller to the water pump mechanism allowing the microcontroller to control the operation of the water pump mechanism.

4. The smart pump of claim 1 where the microcontroller has input ports for receiving signals from one or more sensors for detecting hot water flow by sensing a temperature change in the hot water system.

5. The smart pump of claim 1 where the microcontroller has input ports for receiving signals from one or more sensors for detecting hot water flow by directly sensing movement of the water through the hot water system.

6. The smart pump of claim 1 where the microcontroller is integrated with and housed within a single casing also housing the water pump mechanism.

7. The smart pump of claim 1 where the water pump mechanism comprises an electrically powered motor comprising a stator having a toroidal shape and a rotor concentrically located within the stator; a central shaft connected to the rotor and having an outer end portion extending out from the rotor, and a centrifugal impeller driven by and supported on the central shaft; the pump mechanism further comprises a cavity within the pump mechanism having an inlet to or outlet from the pump, the inlet, outlet and cavity being designed to be connected inline with the hot water system.

8. The smart pump of claim 7 wherein; a sensor for determining if flow is occurring, in the hot water system, being located within the cavity, adjacent the inlet or outlet.

9. The smart pump of claim 8 where a sensor for detecting hot water flow is located in the inlet to the water pump mechanism.

10. The smart pump of claim 8 where a sensor for detecting hot water flow is located in the outlet from the water pump mechanism.

* * * * *